United States Patent
Bryman

(10) Patent No.: US 7,313,544 B1
(45) Date of Patent: Dec. 25, 2007

(54) SYSTEM AND METHOD FOR RESTRICTING OVER-LIMIT ACCOUNTS

(75) Inventor: Evan Lawrence Bryman, Richmond, VA (US)

(73) Assignee: Capital One Financial Corporation, Falls Church, VA (US)

( * ) Notice: Subject to any disclaimer, the term of this patent is extended or adjusted under 35 U.S.C. 154(b) by 1457 days.

(21) Appl. No.: 09/702,728

(22) Filed: Nov. 1, 2000

(51) Int. Cl.
*G06Q 40/00* (2006.01)

(52) U.S. Cl. ............................. 705/39; 705/35; 705/36; 705/37; 705/38; 705/40; 705/44; 235/379; 235/380

(58) Field of Classification Search ................... 705/35, 705/36, 37, 38, 40, 44, 7, 39; 235/379, 380
See application file for complete search history.

(56) References Cited

U.S. PATENT DOCUMENTS

| | | | |
|---|---|---|---|
| 5,239,462 A |  | 8/1993 | Jones et al. |
| 5,530,438 A | * | 6/1996 | Bickham et al. ............ 340/5.8 |
| 5,819,226 A | * | 10/1998 | Gopinathan et al. .......... 705/44 |
| 5,875,236 A | * | 2/1999 | Jankowitz et al. ..... 379/114.24 |
| 5,933,817 A | * | 8/1999 | Hucal ........................... 705/39 |
| 5,950,179 A | * | 9/1999 | Buchanan et al. ............ 705/38 |
| 6,032,134 A | * | 2/2000 | Weissman ..................... 705/40 |
| 6,038,552 A | * | 3/2000 | Fleischl et al. ............... 705/44 |
| 6,047,268 A | * | 4/2000 | Bartoli et al. ................. 705/35 |
| 6,047,270 A | * | 4/2000 | Joao et al. ..................... 705/44 |
| 6,095,413 A | * | 8/2000 | Tetro et al. .................. 235/380 |
| 6,405,173 B1 | * | 6/2002 | Honarvar et al. .............. 705/7 |
| 6,807,533 B1 | * | 10/2004 | Land et al. .................... 705/30 |

OTHER PUBLICATIONS

Kasavana, "Processing Credit Cards", Restaurant Business, v90, n15, pp. 94, Oct. 10, 1991.*
Steinberg, "Amex builds and Expert System to assist its Credit analysts", PC Week v4, n46, pC1(3), Nov. 17, 1987.*
Shott et al., "The Plastic Thief: Preventing Credit Card Fraud . . . ", Credit Union Executive, vol. 35, No. 3, p. 16(8), Dialog File 148, Accession No. 079477406 (1995).
Credit Risk Management Report, "Five Ways to Reduce Risk with Neural Networks", vol. 3, No. 19, Dialog File 636, Accession No. 02020764 (1993).

* cited by examiner

*Primary Examiner*—Nga Nguyen
(74) *Attorney, Agent, or Firm*—Finnegan, Henderson, Farabow, Garrett & Dunner, LLP

(57) ABSTRACT

A system and method is provided for preventing check kiting with credit card products. The disclosed system first determines whether the cardholder is exhibiting check kiting behavior. This is determined by examining an account with a bounced payment to find whether (1) the account became over limit due to the bounced payment, or (2) the account would become over limit if a recent payment bounced. If either is true, the account is marked for further review. The review helps prevent people who have accidentally bounced checks or kited checks from having their accounts restricted. To determine if the cardholder is check kiting, the issuer considers the number of good payments received by the cardholder and the amount that has been kited. If a cardholder has made less than a predetermined number of good payments and has kited an amount greater than a predetermined threshold, the account is restricted. Otherwise, no action is taken on the account. The restriction may be lifted when the account has been placed under limit by payments that have cleared.

28 Claims, 3 Drawing Sheets

SYSTEM AND METHOD FOR RESTRICTING OVER-LIMIT ACCOUNTS

DESCRIPTION OF THE INVENTION

1. Field of the Invention

The present invention is related to credit card products and to systems and methods for preventing the credit limit from being exceeded for such products.

2. Background of the Invention

Credit card products have become so universally well known and ubiquitous that they have fundamentally changed the manner in which financial transactions and dealings are viewed and conducted in society today. Credit card products are most commonly represented by plastic card-like members that are offered and provided to customers through credit card issuers (such as banks and other financial institutions). With a credit card, an authorized customer or cardholder is capable of purchasing services and/or merchandise without an immediate, direct exchange of cash. With each purchase, the cardholder incurs debt which the cardholder may thereafter pay upon receipt of a monthly or otherwise periodic statement. In most cases, the cardholder will have the option to either fully pay the outstanding balance or, as a matter of necessity or choice, defer at least a portion or the balance for later payment with accompanying interest or finance charges for the period during which payment of the outstanding debt is deferred.

The spending power of a credit card (i.e., the total amount of funds available to the cardholder at any particular time for making purchases) is typically limited to a particular amount predetermined by the issuer of the card. This amount is commonly referred to as the "credit limit" of the credit card. When purchases are made or debts incurred with the credit card, the available portion of the credit limit is reduced by the purchase or debt amounts. In addition, interest and/or finance charges are also subtracted from the available portion of the credit limit on a periodic basis. The total debits on a credit card are referred to as the "outstanding balance", while the remaining or available balance of the credit limit is typically called the "available balance" and reflects the dynamically adjusted current spending power of the credit card. The cardholder may increase the available balance up to the credit limit, by paying to the issuer (or its representative) the entire outstanding balance or a fractional portion thereof.

When a payment is received by the issuer, it is sent to a bank or other financial institution for processing. Processing of the payment may range from 15-45 days. If the payment clears, it is called a "good payment", and funds are distributed to the issuer. Similarly, if the payment bounces due to insufficient funds or a non-existent account, it is called a "bad payment", and the issuer receives no funds.

When an issuer receives a bad payment, it temporarily increases the customer's available balance, even though it will not receive any funds from the payment. This is because the issuer increases the available balance before determining whether the payment is good. Usually, the issuer learns the payment is bad about 21 days after its receipt and lowers the available balance accordingly. Although most cardholders bounce payments accidentally, some cardholders purposefully mail bad payments. They use the increased available balance to make additional purchases that will exceed their credit limit. This behavior is called "check kiting".

Credit card issuers are particularly vulnerable to check kiting. Although most issuers restrict accounts for general misuse, they do not specifically target accounts exhibiting check kiting behavior. For example, an issuer may employ a method that restricts an account with an outstanding balance that is extremely over its authorized credit limit. During restriction the customer cannot make purchases or cash advances with the credit card product.

In this example, the account may have an outstanding balance that is twice its limit or thousands over its limit. The account may be over limit due to check kiting or other fraudulent means. For example, a merchant may approve a purchase, knowing that the account does not have sufficient available credit. In this case, the customer is punished even though he did not purposefully kite his payment. Further, many customers who are guilty of check kiting are not stopped because their accounts are not extremely over limit.

Similarly, an issuer may use an alternative method that restricts an account if the customer has previously bounced two or more payments. As described above, most bounced payments are not due to check kiting. Thus, when an issuer uses this method, every customer who accidentally bounces a payment more than once, for example, is restricted. While the first method permits check kiting behavior in too many accounts, this method restricts many accounts that are not check kiting.

In view of the foregoing, there is presently a need for an improved system and method for responding to and preventing check kiting behavior on credit card products.

SUMMARY OF THE INVENTION

Systems and methods consistent with the principles of the present invention address the need to reduce fraud on a financial account. Specifically, systems and methods consistent with the invention may identify an account for potential fraud based on payments made to the account, review account transactions of the identified account to determine whether fraud has been made on the account, and restrict the identified account.

Further, systems and methods consistent with the invention may identify an account by locating an account having a bad payment, determining whether the bad payment made an outstanding balance of the account over a predetermined limit, and flagging the account for review when the bad payment made the outstanding balance of the account over the predetermined limit. Similarly, systems and methods consistent with the invention may identify an account by locating an account having a bad payment, determining whether an outstanding payment would make the outstanding balance of the account over the predetermined limit if it the payment is bad, and flagging the account for review when the outstanding payment would make the outstanding balance of the account over the predetermined limit if it is bad.

Still further, systems and methods consistent with the invention may review the account by comparing the number of good payments made on the account to a good payment threshold, determining an over limit credit amount that an outstanding balance of the account has exceeded a predetermined limit at a specific time, determining a total over limit credit amount by totaling each over limit credit amount during a predetermined time period, comparing the total over limit credit amount with an over limit threshold, and restricting the account when the number of good payments is less than the good payment threshold and the total over limit credit amount is greater than the over limit threshold.

According to another aspect of the invention, a computer program is provided for reducing fraud on a financial account. The computer program product may comprise computer-readable media having computer-readable code, wherein the computer program product comprises the following computer-readable program code for effecting actions in a computing platform: program code for identifying an account for potential fraud based on payments made to the account, program code for reviewing account transactions of the identified account to determine whether fraud has been made on the account, and program code for restricting the identified account.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

DESCRIPTION OF THE PREFERRED EMBODIMENTS

Systems and methods consistent with the present invention protect credit card issuers from authorized cardholders or customers who are check kiting. The method determines whether a customer is check kiting and restricts the accounts of those customers who are check kiting. More specifically, the method analyzes the accounts of customers who have bounced payments to determine: (1) if they have exceeded their credit limit due to the bounced payments; and (2) if they will exceed their credit limit if a recent check bounces. If either situation is true, the account is reviewed to determine whether the customer is check kiting.

During the review, the method counts the number of good payments and the amount the account has become over limit due to bounced checks over the account's lifetime. These totals are compared with predetermined thresholds. If the number of good payments is less than the good payment threshold and the total of the over limit amount is greater than the over limit threshold, the method determines that the cardholder is check kiting and restricts the account. While the account is restricted, the customer cannot make any purchases or cash advances with the credit card.

The above-noted features and other aspects and principles of the present invention may be implemented in various system or network environments to provide automated computational tools to facilitate data collection and risk analysis. Such environments and applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with the teachings of the invention, or it may be more convenient to construct a specialized apparatus or system to perform the required methods and techniques. The present invention also relates to computer readable media that include program instruction or program code for performing various computer-implemented operations based on the methods and processes of the invention. The media and program instructions may be those specially designed and constructed for the purposes of the invention, or they may be of the kind well-known and available to those having skill in the computer software arts. Examples of program instructions include both machine code, such as produced by compiler, and files containing a high level code that can be executed by the computer using an interpreter.

Figure 1:
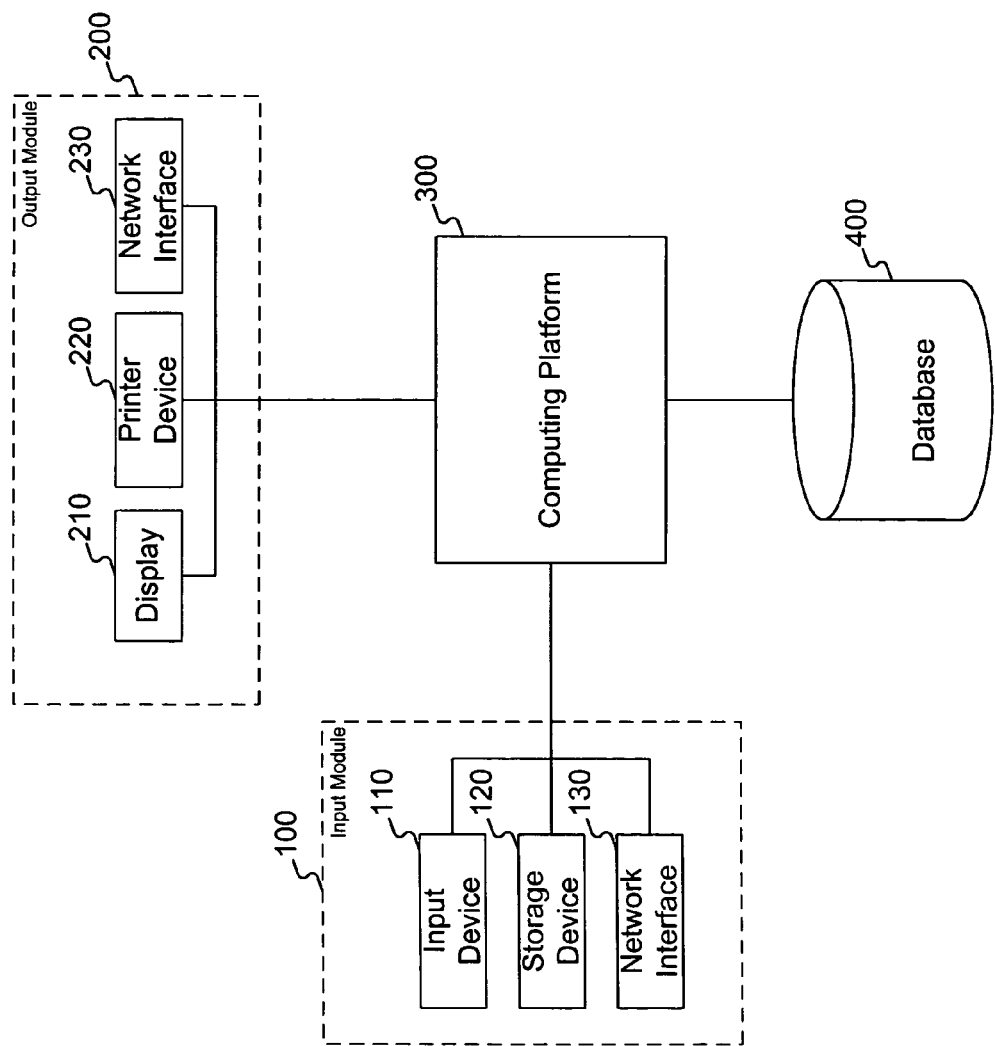
FIG. 1 illustrates an exemplary system environment in which the features of the present invention may be implemented.

By way of a non-limiting example, FIG. 1 illustrates a system environment 50 in which the features and principles of the present invention may be implemented. As illustrated in the block diagram of FIG. 1, system environment 50 includes an input module 100, an output module 200, a computing platform 300, and a database 400. Computing platform 300 is adapted to provide the necessary functionality and computing capabilities to analyze each customer's account data received from input module 100. The results of analyzing the data are provided as output from computing platform 300 to output module 200, which prints or displays the results, or outputs it to other system devices. The output results may include a list accounts that require review or a list of accounts that require restriction for check kiting. Output from computing platform 300 can also be provided to database 400, which may be utilized as a persistent storage device for storing, for example, restricted credit card account information and/or general account information such as the purchase and payment history of each customer's account.

In the embodiment of FIG. 1, computing platform 300 preferably comprises a PC or mainframe computer for performing various functions and operations of the invention. Computing platform 300 may be implemented, for example, by a general purpose computer selectively activated or reconfigured by a computer program stored in the computer, or may be a specially constructed computing platform for carrying out the features and operations of the present invention. Computing platform 300 may also be implemented or provided with a wide variety of components or subsystems including, for example, one or more of the following: a central processing unit, a co-processor, memory, registers, and other data processing devices and subsystems. Computing platform 300 also communicates or transfers customer and credit data to and from input module 100 and output module 200 through the use of direct connections or communication links, as illustrated in FIG. 1.

Alternatively, communication between computing platform 300 and modules 100, 200 can be achieved through the use of a network architecture (not shown). In the alternative embodiment (not shown), the network architecture may comprise, alone or in any suitable combination, a telephony-based network (such as a PBX or POTS), a local area network (LAN), a wide area network (WAN), a dedicated intranet, and/or the Internet. Further, it may comprise any suitable combination of wired and/or wireless components and systems. By using dedicated communication links or a shared network architecture, computing platform 300 may be located in the same location or at a geographically distant location from input module 100 and/or output module 200.

Input module 100 of system environment 50 may be implemented with a wide variety of devices to receive and/or provide the data as input to computing platform 300. As illustrated in FIG. 1, input module 100 includes an input device 110, a storage device 120, and/or a network interface 130. Input device 110 may comprise a keyboard, a mouse, a disk drive or any other suitable input device for providing customer data to computing platform 300. Memory device 120 may be implemented with various forms of memory or storage devices, such as read-only memory (ROM) devices and random access memory (RAM) devices. Storage device 120 may include a memory tape or disk drive for reading and providing credit history on the account as input to computing platform 300 for the identification and review processes. Input module 100 may also include network interface 130, as illustrated in FIG. 1, to receive data over a network (such as a LAN, WAN, intranet or the Internet) and to provide the same as input to computing platform 300. For example, network interface 130 may be connected to a public or private database over a network for the purpose of receiving and transferring customer or credit data to computing platform 300.

As illustrated in FIG. 1, output module 200 includes a display 210, a printer device 220, and/or a network interface 230 for receiving the results provided as output from computing module 200. As indicated above, the output from computing platform 300 may include a list of accounts that require review or a list of accounts that require restriction for check kiting. The output from computing platform 300 may be displayed or viewed through display 210 (such as a CRT or LCD) and printer device 220. If needed, network interface 230 may also be provided to facilitate the communication of the results from computing platform 300 over a network (such as a LAN, WAN, intranet or the Internet) to remote or distant locations for further analysis or viewing. In either case, the output from output module 200 can be used by the credit card issuer to generate, for example, a list of cardholders who need further review or who are check kiting. The output from output module 200 can also be used for other purposes, such as internal reports or monitoring.

In accordance with the principles of the present invention, an exemplary process for determining whether a customer is check kiting will now be described with reference to FIGS. 2 and 3.

Figure 2:
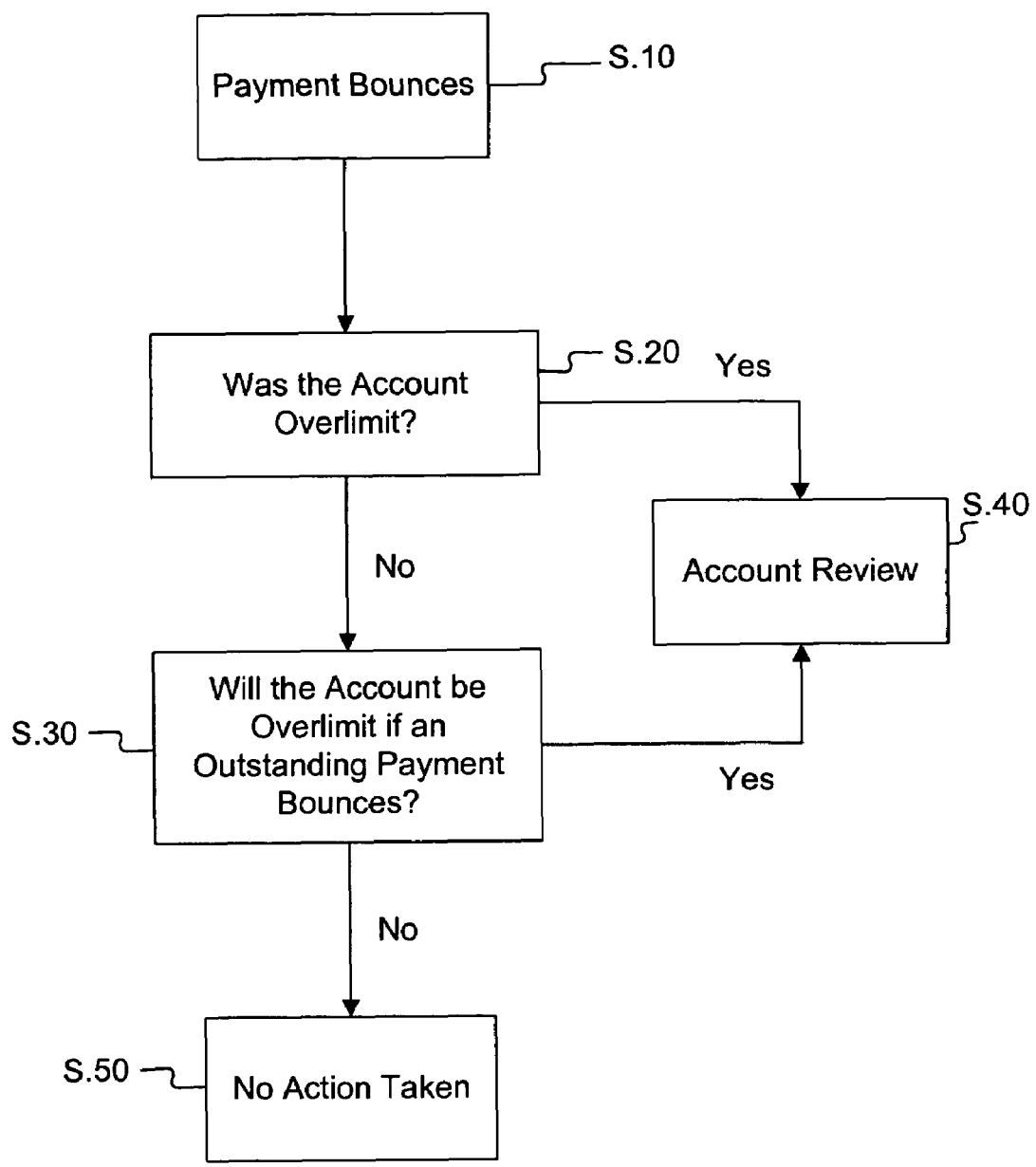
FIG. 2 is an exemplary flowchart of a process for identifying accounts exhibiting possible check-kiting behavior, consistent with the principles of the present invention.

FIG. 2 is an exemplary flowchart of a process for identifying accounts exhibiting possible check kiting behavior in a manner consistent with the principles of the present invention. As shown in FIG. 2, the credit card issuer first determines whether a cardholder has made a "bad" payment recently (i.e., a payment that bounced) (step S.10). For example, computing platform 300 or a similar device identifies accounts that have bounced a payment within the past 4 months or so.

If the customer has made a bounced payment, computing platform 300 determines whether the account became "over limit" (i.e. the outstanding balance became higher than the credit limit) due to the bounced payment (step S.20). As described above, when a customer makes a payment on an account with outstanding balance, computing platform 300 decreases the outstanding balance and increases the available balance. However if the payment was bad, it will take approximately 15-45 days to bounce. During this time, the customer can make purchases or cash advances that will cause the account to exceed its credit limit.

If the account did not become over limit as a result of payment bouncing, computing platform 300 considers whether the account would become over limit if an outstanding payment bounces (step S.30). For example, computing platform 300 may consider any purchases or cash advances made since the payment was posted to determine whether the outstanding balance would exceed the credit limit if it were increased by the amount of the recent payment. If the account did not become over limit due to the bounced payment and would not become over limit if an outstanding payment bounces, no action is taken on the account (step S.50). Otherwise, the account is flagged for further review (step S.40).

Each of the above steps for identifying accounts with possible check kiting activity are performed automatically by computing platform 300 or a similar device. Once an account is flagged, computing platform 300 or a similar device reviews the a account to determine whether the cardholder is check kiting.

Figure 3:
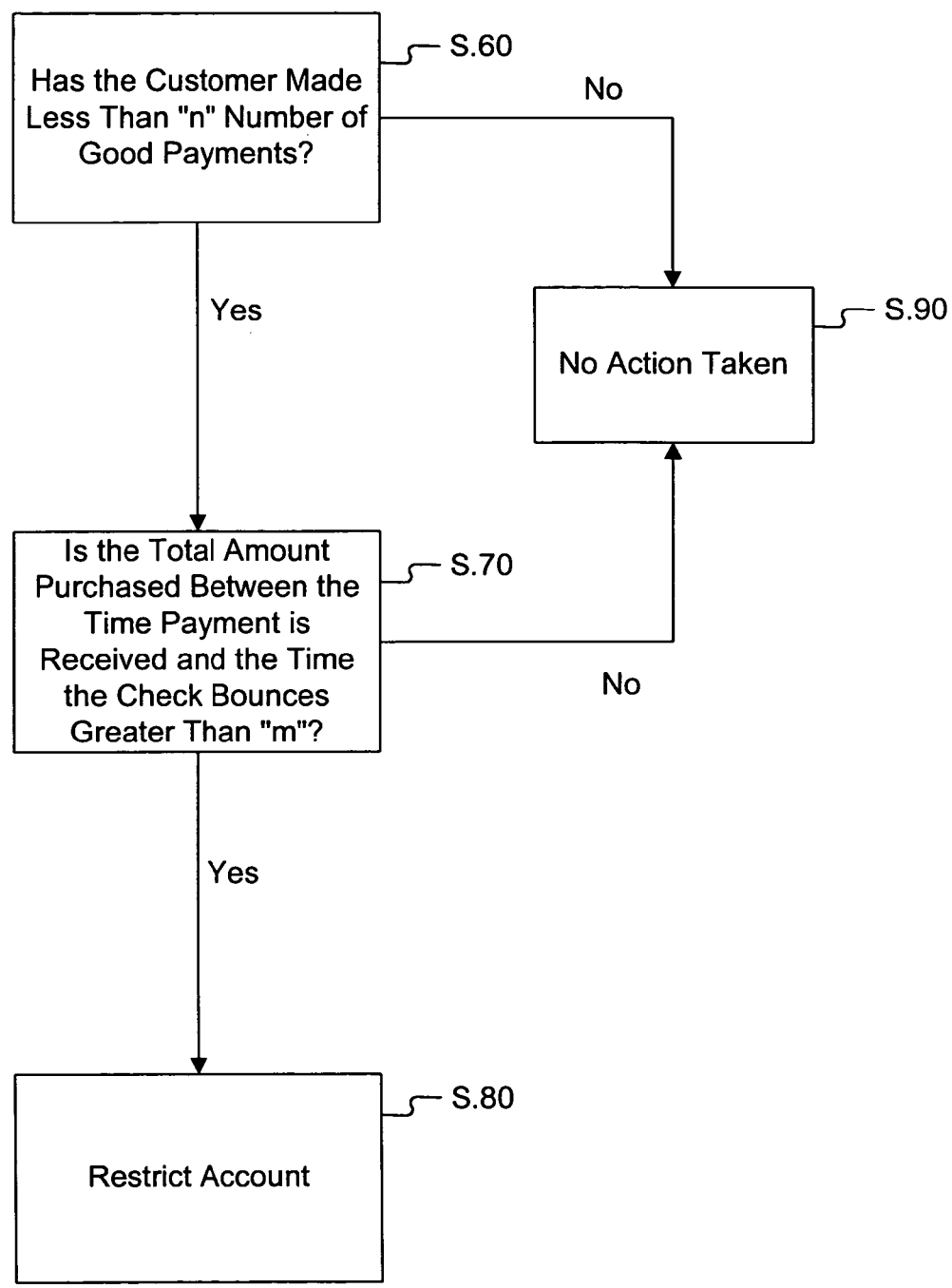
FIG. 3 is an exemplary flowchart of a manual review process, consistent with the principles of the present invention.

FIG. 3 is an exemplary flowchart of a review process consistent with the principles of the present invention. As shown in FIG. 3, computing platform 300 first considers the number of good payments the customer has made and compares it with a predetermined threshold "n" (step S.60). Good payments refer to payments that have cleared. They do not include outstanding payments, which may bounce later. In a preferred embodiment, the good payment threshold is three payments. However, one skilled in the art will appreciate that countless other threshold values may be used. If the cardholder has made at least the threshold number of good payments in a certain time period, such as during the past year or over the course of the account, computing platform 300 does not take action on the account (step S.90).

By considering the number of good payments, the issuer can determine more accurately whether the cardholder is check kiting. For example, a cardholder who regularly makes good payments may have accidentally made a bad payment. In this case, the customer may have made purchases after the payment was made, not knowing the payment would bounce and his credit limit would be exceeded. Because this was likely a fluke occurrence, the issuer does not restrict the account. However, if the customer has not met the minimum threshold of good payments, the bounced payment is less likely to be a fluke, and more likely to be fraud.

Therefore, if the customer has not met the threshold number of good payments, computing platform 300 considers the lifetime amount of purchases or cash advances that have become over limit due to bounced payments and compares it with a predetermined threshold "m" (step S.70). Specifically, for each bounced payment, computing platform 300 determines the amount of purchases or cash advances made between the time a payment was posted and the time it bounced, and when there was no pre-existing available credit. Computing platform 300 sums the amount the credit limit was exceeded for each bad payment received, obtaining a lifetime over limit total.

If this total is less than or equal to the over limit threshold "m", no action is taken on the account (step S.90). However, if the total exceeds the over limit threshold and the number of good payments is less than the good payment threshold, then computing platform 300 may restrict the account (step S.80).

In a preferred embodiment, the over limit threshold is $200. However, one skilled in the art will appreciate that countless other values may be used. Although the process of determining whether a cardholder is check kiting has been described as an automated process performed by computing platform 300 or a similar device, those skilled in the art will recognize the account may be reviewed manually in an alternative embodiment.

Once a cardholder's account is restricted, he will not be able to make additional purchases or cash advances until the restriction is lifted. The restriction may be lifted by the issuer when deemed appropriate. In a preferred embodiment, the issuer may lift the restriction when the account is brought under-limit by cleared checks.

Systems consistent with the present invention overcome the shortcomings of conventional apparatus and methods for preventing loss due to check kiting. By determining whether a customer exhibits check kiting behavior, as described herein, systems and methods of the invention as disclosed herein minimize risk to credit card issuers susceptible to fraud.

Other embodiments of the invention will be apparent to those skilled in the art from consideration of the specification and practice of the invention disclosed herein. The present invention is not limited for use with credit card products and may be used with any financial account, in which a customer may make purchases using bad payments. For example, in another embodiment, the invention may be applied to a debit card, such as a stored value card. With a stored value card, the customer mails a payment to the issuer, which is credited to the customer's account for subsequent purchases. If the payment is bad, the customer may purchase goods for which the issuer does not receive payment. Similarly, the invention could be used with a checking account. It is intended that the specification and examples be considered as exemplary only, with a true scope and spirit of the invention being indicated by the following claims.

What is claimed is:

1. A computer-implemented method for reducing check kiting on a financial account, said method comprising:
   electronically identifying an account for potential check kiting based on payments made to the account that made or would make an outstanding balance of the account to exceed a predetermined limit;
   reviewing account transactions of the identified account to determine whether check kiting has been made on the account; and
   restricting the identified account when it has been determined that check kiting has been made on the account.

2. The method of claim 1, wherein identifying an account further comprises:
   locating an account having a bad payment;
   determining whether the bad payment made an outstanding balance of the account over a predetermined limit;
   determining whether an outstanding payment would make the outstanding balance of the account over the predetermined limit if the payment is bad; and
   flagging the account for review when the bad payment made the outstanding balance of the account over the predetermined limit or the outstanding payment would make the outstanding balance of the account over the predetermined limit if the outstanding payment is bad.

3. The method of claim 1, wherein identifying an account further comprises:
   locating an account having a bad payment;
   determining whether the bad payment made an outstanding balance of the account over a predetermined limit; and
   flagging the account for review when the bad payment made the outstanding balance of the account over the predetermined limit.

4. The method of claim 1, wherein identifying an account further comprises:
   locating an account having a bad payment;
   determining whether an outstanding payment would make the outstanding balance of the account over the predetermined limit if the payment is bad; and
   flagging the account for review when the outstanding payment would make the outstanding balance of the account over the predetermined limit if the outstanding payment is bad.

5. The method of claim 1, wherein reviewing comprises:
   comparing the number of good payments made on the account to a good payment threshold;
   determining an over limit credit amount that an outstanding balance of the account has exceeded a predetermined limit at a specific time;
   determining a total over limit credit amount by totaling each over limit credit amount during a predetermined time period;
   comparing the total over limit credit amount with an over limit threshold; and
   restricting the account when the number of good payments is less than the good payment threshold and the total over limit credit amount is greater than the over limit threshold.

6. The method of claim 1, wherein reviewing comprises:
   comparing the number of good payments made on the account to a good payment threshold; and
   restricting the account when the number of good payments is less than the good payment threshold.

7. The method of claim 1, wherein reviewing comprises:
   determining an over limit credit amount that an outstanding balance of the account has exceeded a predetermined limit at a specific time;
   determining a total over limit credit amount by totaling the over limit credit amount during a predetermined time period;
   comparing the total over limit credit amount with an over limit threshold; and
   restricting the account when the total over limit credit amount is greater than the over limit threshold.

8. The method of claim 1, wherein reviewing is performed manually.

9. The method of claim 1, wherein reviewing is performed automatically.

10. The method of claim 1, wherein reviewing account transactions includes determining how many good payments the customer has made within a predetermined time period.

11. A computer program product for reducing check kiting on a financial account, the computer program product comprising computer-readable media having computer-readable code, the computer program product comprising the following computer-readable program code for effecting actions in a computing platform:
   program code for identifying an account for potential check kiting based on payments made to the account that made or would make an outstanding balance of the account to exceed a predetermined limit;
   program code for reviewing account transactions of the identified account to determine whether check kiting has been made on the account; and
   program code for restricting the identified account when it has been determined that check kiting has been made on the account.

12. The computer program product of claim 11, wherein said program code for identifying an account further comprises:

program code for locating an account having a bad payment;

program code for determining whether the bad payment made an outstanding balance of the account over a predetermined limit;

program code for determining whether an outstanding payment would make the outstanding balance of the account over the predetermined limit if the payment is bad; and program code for flagging the account for review when the bad payment made the outstanding balance of the account over the predetermined limit or the outstanding payment would make the outstanding balance of the account over the predetermined limit if the outstanding payment is bad.

13. The computer program product of claim 11, wherein said program code for identifying an account further comprises:

program code for locating an account having a bad payment;

program code for determining whether the bad payment made an outstanding balance of the account over a predetermined limit; and program code for flagging the account for review when the bad payment made the outstanding balance of the account over the predetermined limit.

14. The computer program product of claim 11, wherein said program code for identifying an account further comprises:

program code for locating an account having a bad payment;

program code for determining whether an outstanding payment would make the outstanding balance of the account over the predetermined limit if the payment is bad; and program code for flagging the account for review when the outstanding payment would make the outstanding balance of the account over the predetermined limit if the outstanding payment is bad.

15. The computer program product of claim 11, wherein said program code for reviewing comprises:

program code for comparing the number of good payments made on the account to a good payment threshold;

program code for determining an over limit credit amount that an outstanding balance of the account has exceeded a predetermined limit at a specific time;

program code for determining a total over limit credit amount by totaling each over limit credit amount during a predetermined time period;

program code for comparing the total over limit credit amount with an over limit threshold; and program code for restricting the account when the number of good payments is less than the good payment threshold and the total over limit credit amount is greater than the over limit threshold.

16. The computer program product of claim 11, wherein said program code for reviewing comprises:

program code for comparing the number of good payments made on the account to a good payment threshold; and program code for restricting the account when the number of good payments is less than the good payment threshold.

17. The computer program product of claim 11, wherein said program code for reviewing comprises:

program code for determining an over limit credit amount that an outstanding balance of the account has exceeded a predetermined limit at a specific time;

program code for determining a total over limit credit amount by totaling the over limit credit amount during a predetermined time period;

program code for comparing the total over limit credit amount with an over limit threshold; and program code for restricting the account when the total over limit credit amount is greater than the over limit threshold.

18. The computer program product of claim 11, wherein said program code for reviewing account transactions includes determining how many good payments the customer has made within a predetermined time period.

19. A system for reducing check kiting on a financial account, said system comprising:

means for identifying an account for potential check kiting based on payments made to the account that made or would make an outstanding balance of the account to exceed a predetermined limit;

means for reviewing account transactions of the identified account to determine whether check kiting has been made on the account; and means for restricting the identified account when it has been determined that check kiting has been made on the account.

20. The system of claim 19, wherein said means for identifying an account further comprises:

means for locating an account having a bad payment;

means for determining whether the bad payment made an outstanding balance of the account over a predetermined limit;

means for determining whether an outstanding payment would make the outstanding balance of the account over the predetermined limit if the payment is bad; and means for flagging the account for review when the bad payment made the outstanding balance of the account over the predetermined limit or the outstanding payment would make the outstanding balance of the account over the predetermined limit if the outstanding payment is bad.

21. The system of claim 19, wherein said means for identifying an account further comprises:

means for locating an account having a bad payment;

means for determining whether the bad payment made an outstanding balance of the account over a predetermined limit; and means for flagging the account for review when the bad payment made the outstanding balance of the account over the predetermined limit.

22. The system of claim 19, wherein said means for identifying an account further comprises:

means for locating an account having a bad payment;

means for determining whether an outstanding payment would make the outstanding balance of the account over the predetermined limit if the payment is bad; and means for flagging the account for review when the outstanding payment would make the outstanding balance of the account over the predetermined limit if the outstanding payment is bad.

23. The system of claim 19, wherein said means for reviewing comprises:

means for comparing the number of good payments made on the account to a good payment threshold;

means for determining an over limit credit amount that an outstanding balance of the account has exceeded a predetermined limit at a specific time;

means for determining a total over limit credit amount by totaling each over limit credit amount during a predetermined time period;

means for comparing the total over limit credit amount with an over limit threshold; and means for restricting the account when the number of good payments is less than the good payment threshold and the total over limit credit amount is greater than the over limit threshold.

24. The system of claim 19, wherein said means for reviewing comprises:

means for comparing the number of good payments made on the account to a good payment threshold; and means for restricting the account when the number of good payments is less than the good payment threshold.

25. The system of claim 19, wherein said means for reviewing comprises:

means for determining an over limit credit amount that an outstanding balance of the account has exceeded a predetermined limit at a specific time;

means for determining a total over limit credit amount by totaling the over limit credit amount during a predetermined time period;

means for comparing the total over limit credit amount with an over limit threshold; and means for restricting the account when the total over limit credit amount is greater than the over limit threshold.

26. The system of claim 19, wherein said means for reviewing is performed manually.

27. The system of claim 19, wherein said means for reviewing is performed automatically.

28. The system of claim 19, wherein said means for reviewing account transactions includes determining how many good payments the customer has made within a predetermined time period.

* * * * *